Oct. 10, 1950     F. W. HENNINGS ET AL     2,525,351
DUAL WHEEL HANDLING APPARATUS
Filed Dec. 1, 1947
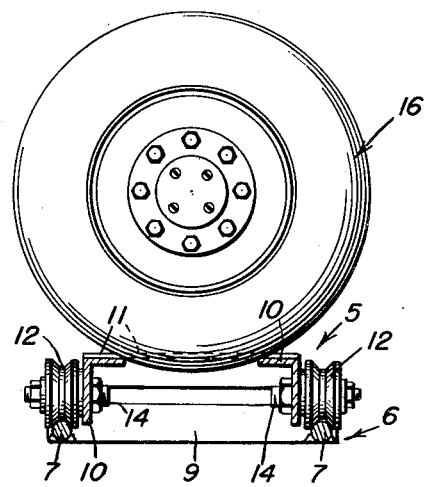
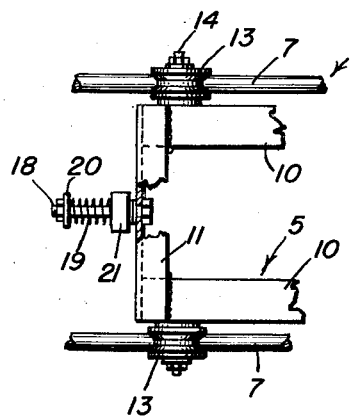
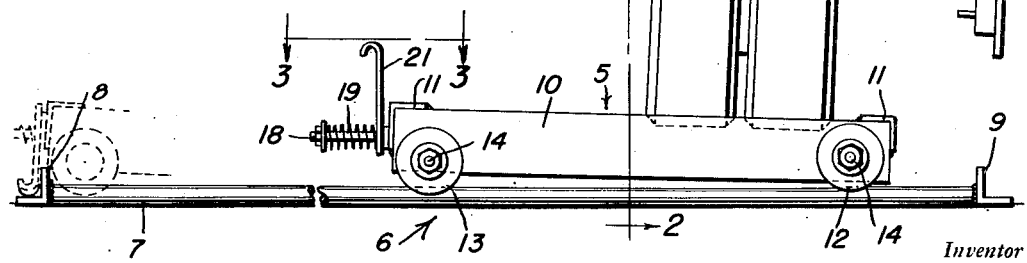
Inventor
Fred W. Hennings
Lester L. Wilhelm
By *Clarence A. O'Brien and Harvey B. Jacobson*
Attorneys Patented Oct. 10, 1950

2,525,351

UNITED STATES PATENT OFFICE 2,525,351

DUAL WHEEL HANDLING APPARATUS

Fred W. Hennings and Lester L. Wilhelm, Davenport, Iowa

Application December 1, 1947, Serial No. 789,032

1 Claim. (Cl. 105—157)

The present invention relates to a novel apparatus to assist in the handling of dual truck wheels within the vicinity of the truck and in a manner to facilitate changing tires, making repairs and doing whatever else may be necessary without interference from the dual wheel assembly.

As is evident from the introductory statement of the invention, rollable dollies and carriages designed for supporting and shifting dual wheels toward and from the axle structure are not new. Exemplary of the styles and forms familiar to us are small roller supported trucks disclosed, for example, in the vehicle wheel supporting truck of A. E. Gentry 2,246,882 of June 24, 1941, and a similarly constructed wheel truck of W. Y. Brown Patent 2,102,674 of December 21, 1937.

In carrying out the principles of the instant invention we have evolved and produced a structural adaptation and novel arrangement of parts constituting what is believed to be an apparatus which, compared to similar structures known to us, is possessed of appreciable refinements and improvements.

More specifically, it is an object of the invention to provide an assemblage embodying a simple track structure and a dolly or carriage cooperable therewith, the latter being such as to conveniently and satisfactorily support the dual wheel means.

It is a further object of the invention to provide a track structure one end of which may be placed beneath the truck wheels, when the latter are jacked up, the other end extending to a distance beyond and outwardly of the truck wheels so that when the latter are dismounted, they may be rolled out on the track and away from the axle, and latched in the outward position in order to be thus located in an out-of-the-way spot which will be helpful to the mechanic attending to the brake repair or other services.

Other objects and advantages will become more readily apparent from the following description and the accompanying illustrative drawings.

In the accompanying drawings, wherein like numerals are employed to designate like parts throughout the views:

Figure 1 is a side elevational view of an apparatus constructed in accordance with this invention showing a fragmentary portion of the vehicle axle structure and the dual wheels moving to the stated out-of-the-way position.

Figure 2 is a transverse vertical sectional view on the line 2—2 of Figure 1, looking in the direction of the arrows.

Figure 3 is a fragmentary top view illustrating certain of the details of construction, the section being on the line 3—3 of Figure 1.

Referring now to the drawings by distinguishing reference numerals it will be seen that the dolly or wheel supporting carriage is denoted by the numeral 5 and the same is disposed for operation on portable track means 6. The latter comprises a pair of rods 7 in spaced parallelism and these are cylindrical in cross section and provide the rails. They are welded or otherwise integrated at their outer ends to transverse angle irons 8 and 9. The angle irons have their vertical flanges projecting above the rails to function as stops thus limiting the shifting movement of the dolly in opposite directions in relation to the track means.

The dolly 5 is a simple small truck or carriage and comprises a pair of longitudinal angle irons 10 connected at opposite ends by smaller right angularly disposed angle irons 11. We provide, in addition, inner and outer pairs of track engaging wheels, the inner wheels being denoted by the numerals 12 and the outer wheels by the numerals 13. These wheels are removably fastened on projecting end portions of suitable sub-axles 14. The variation in the heights of stub axles and the rollers or wheels is intentional to compensate for the taper and tilt of the jacked axle on which the truck wheels are mounted. Incidentally, the axle in Figure 1 is denoted by the numeral 15 and the wheel assembly is denoted by the numeral 16. The wheels are of a rubber tired type and are adapted to set and remain in position in vertical positions on and between the horizontal flanges of the side angle irons 10. This is brought out in Figures 1 and 2 considered collectively. The peripheral portions of the wheels 12 and 13 are suitably grooved to adapt same for movement back and forth on the track rails 7.

The numeral 18 designates a bolt carried by the forward angle iron and provided with a coiled spring 19 held in place by a nut and washer arrangement 20, said spring serving to support, in a normal out-of-the-way position, a latch hook 21, which may be swung down to take a horizontal position and the bill of the hook may be engaged over the adjacent end of the cross-iron 8, whereby to hold the dolly at one end of the track means and to position the wheels at the same spot whereby they are fully out-of-the-way of the axle and vehicle.

It is a matter of common knowledge that dual wheel assemblies on heavy duty trucks are of considerable weight and the load is difficult for workmen to handle and cope with. It is for this reason that all sorts of carriages and dollies have been provided to assist workers in moving the wheels back and forth in relation to the chassis of the truck. In the instant case the truck wheels are jacked up and the right hand end of the track structure is slid between the road and treads of the tires in an obvious manner. Then, the dolly is pushed up sufficiently close that it will be in readiness to receive the dual wheel assembly once the same is detached from the axle structure. By lowering the jack and allowing the wheels to drop down on the dolly it is obvious that the dolly may then be pushed toward the left and latched in an out-of-the-way position, thus affording workmen requisite clearance and "elbow room" for accomplishments unhampered by the presence of heavy wheels.

Changes in shape, size, materials and rearrangement of details and parts may be resorted to in actual practice, so long as they do not depart from the spirit of the invention or the scope of the appended claim, as is well understood.

Having described the invention, what is claimed as new is:

A heavy-duty dual truck wheel mounting, demounting and handling construction of the class shown and described comprising a portable base frame embodying a pair of spaced parallel longitudinal side members secured together at opposite ends by transverse end members, a freely mobile dolly embodying a rigid horizontally disposed carriage including spaced parallel members spaced distances apart to receive and afford substantial support to a substantial arc of the tires of the dual wheels, axle means mounted at one end of said carriage, wheels carried by said axle means and rollable on said longitudinal side members, axle means carried by the opposite end of said carriage, wheels also carried by said last-named axle means and in rollable contact with said side members, the axle means at one end of the carriage being in a plane different from the axle means at the opposite end of said carriage and the latter being inclined downwardly toward the normally inner end of said base, the inclination of said carriage corresponding substantially to the inclination taken by the vehicle axle after the latter axle is jacked up for wheel mounting and demounting purposes.

FRED W. HENNINGS.
LESTER L. WILHELM.

REFERENCES CITED

The following references are of record in the file of this patent:

UNITED STATES PATENTS

| Number | Name | Date |
|---|---|---|
| 160,821 | Gilman | Mar. 16, 1875 |
| 637,044 | Straight | Mar. 14, 1899 |
| 781,427 | Hussey | Jan. 30, 1905 |
| 1,249,305 | Black | Dec. 11, 1917 |
| 1,361,889 | Miller et al. | Dec. 14, 1920 |
| 1,753,327 | Baldwin | Apr. 8, 1930 |
| 2,019,949 | Brace | Nov. 5, 1935 |
| 2,042,265 | Main | May 26, 1936 |
| 2,178,693 | McMullen | Nov. 7, 1939 |
| 2,231,560 | Campion | Feb. 11, 1941 |
| 2,483,817 | Ehinger | Oct. 4, 1949 |